Nov. 7, 1950     R. I. HELLER     2,529,022

CHECK PROTECTOR

Filed Oct. 4, 1946

RICHARD I. HELLER,
INVENTOR.

BY
ATTORNEY.

Patented Nov. 7, 1950

2,529,022

UNITED STATES PATENT OFFICE 2,529,022

CHECK PROTECTOR

Richard I. Heller, Los Angeles, Calif.

Application October 4, 1946, Serial No. 701,314

3 Claims. (Cl. 101—24)

The present invention relates to check protectors in general and particularly to an improved personal check protector. More specifically the invention comprises a check protector of light weight adapted to be transported in the pocket and incorporating improvements which enable the check to be positioned easily for the protecting operation.

Literally millions of negotiable instruments are issued each day. The usual bank check is the best known example and is widely used by the ordinary citizen in the settlement of his accounts. The blank form is usually provided by a bank and is filled out by the drawer payable to a party certain, or to his order, in a sum certain and at a definite or determinable future time. Negotiable instruments are passed from holder to holder and in the hands of a bona fide holder for value are free from nearly all legal defenses and are almost as acceptable as currency in business circles.

It becomes important to maintain the integrity of these negotiable instruments and it is the duty of the maker or drawer to exercise due care in their preparation to prevent alterations by wrongdoers. The ordinary citizen, however, is not too well versed in the proper preparation of a check and frequently they are drawn in a manner which presents a ready opportunity to one wishing to make changes therein. When such changes are made, there is usually resulting loss upon an innocent party and the acceptability of negotiable instruments in general is to that extent damaged.

Check protecting devices have gained wide usage in commercial circles. Marks, including indentations and perforations, are usually made by such devices upon the instrument after it has been drawn, such marks being so positioned that any erasures or alterations would be easily observed. These protecting marks, however, have not in the past gained wide usage among the citizenry and yet it is this class which has the greatest need therefor. Possibly the usual check represents a higher percentage of the wealth of the drawer when drawn by an individual than it does when drawn by a business institution.

The check protecting unit constructed in accordance with the present invention is adapted primarily for use by the individual. It is simply constructed and of light weight so that it is adapted to be transported in the pocket and in the check pad jacket where it is available for use each time a check is drawn. Upon the completion of the drawing of the check, it is a simple matter to position it properly and to perform the protecting operation, only seconds being required. The unit is adapted for economical manufacture so as to meet a wide market demand.

With the foregoing in mind, it is an object of the present invention to provide a new and improved personal check protector.

It is another object of the invention to provide a check protector incorporating improved check positioning means.

A still further object of the invention is to provide a light weight portable check protector in which the check marking unit is pivotally supported at one end to permit of movement to open position as to enable the check to be positioned properly for the protecting operation.

These and other more specific objects will appear upon reading the following specification and claims and considering in connection therewith the attached drawings to which they relate.

Referring now to the drawings in which a preferred embodiment of the invention is illustrated:

The check protecting unit constructed in accordance with the present invention consists of a base 10 including a plate 11. The forward part of the plate is formed at one side with a wall 12 and at the opposite side is turned upon itself to form journals 13, the use of which will be explained.

Figures 1, 2, 3:
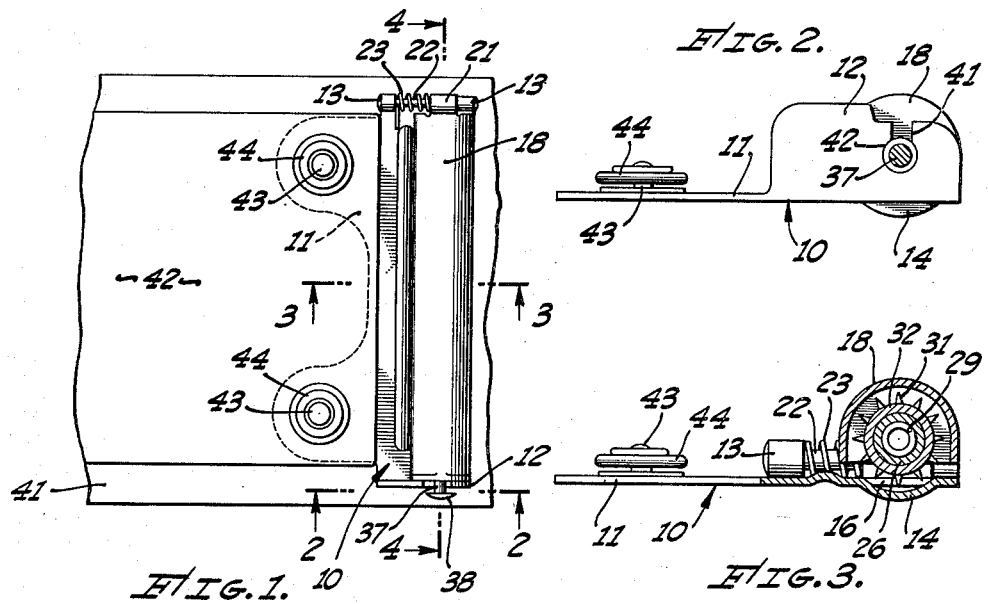
Figure 1 is a top plan view of the unit constructed in accordance with the present invention attached to a check pad jacket partially shown.
Figure 2 is a side view looking in the direction of the arrows of line 2—2 of Figure 1.
Figure 3 is a transverse section upon the line 3—3 of Figure 1.
Figure 4:
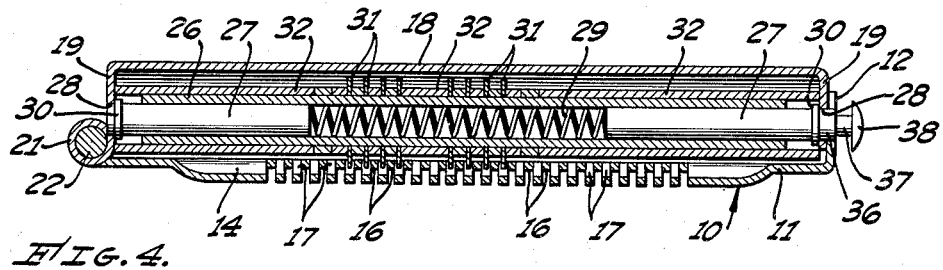
Figure 4 is a longitudinal section through the unit upon the line 4—4 of Figure 1.
Figure 5:
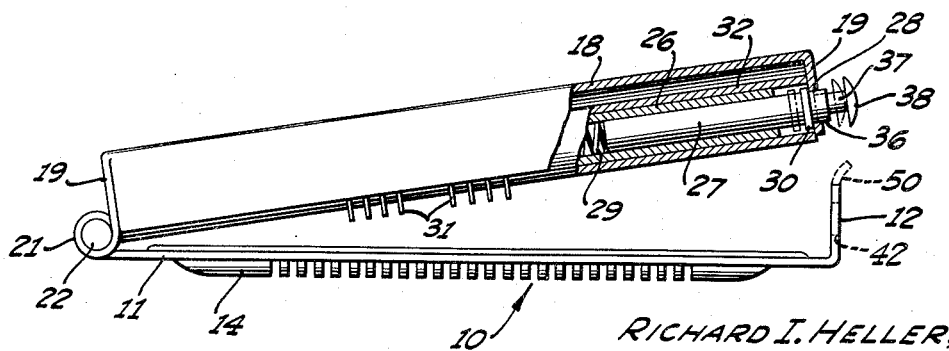
Figure 5 is a front view of the unit pivoted to its open check receiving position, certain parts being broken away and shown in section.

A depressed channel 14 extends transversely across the plate 11 between the wall 12 and journals 13, a multiplicity of ribs 16 extending across the top of the channel in the plane of the plate 11, being spaced by slots 17. An inverted U-sectioned channel, housing or carrier 18 extends between the wall 12 and the journals 13 being formed with end walls 19. One of the latter is formed with an overturned extremity 21 which forms a journal similar to journals 13 and is positioned therebetween. A pin 22 extends through journals 13 and 21 to mount the latter pivotally, an encircling coil spring 23 on the pin urging the journal 21 at all times to a position adjacent the forward plate journal 13. Pin 22 pivotally supports the housing 18 for movement from an operative position, illustrated in Figure 4 in which an end wall 19 lies adjacent and just inside the base wall 12, to an inoperative position in which the housing is pivoted from the base, as for example the position illustrated in Figure 5.

The check marking means are carried by the housing or carrier 18 and comprise an elongated sleeve 26 which slidingly seats pins or detents 27, the ends of which are spaced by flanges 30, and which project into seats 28 formed in the end walls 19 of the housing. A coil spring 29 is positioned centrally within sleeve 26 and at all times urges the detents outwardly and into the seats 28. A plurality of spaced toothed rotors or wheels 31 are rotatably mounted upon the sleeve 26, being spaced by spacers or rings 32 of various sizes adapted to provide proper spacing. Wheels 31 are so located that their circumferentially spaced teeth project into the slots 17 between the ribs 16 with the carrier in its lowered operating position illustrated in Figure 4.

To retain the carrier in operative position the detent 27 adjacent the base wall 12 is extended at 36 beyond the housing wall 19 and connects by a reduced neck 37 to an enlarged force receiving head 38. Wall 12 is provided with a vertically extending slot 41, of a diameter to receive the neck 37, and with a seat 42 at the inner end of the slot sufficiently large to receive the detent extension 36. Under the normal actuation of the coil spring 29 the latter seats within the wall seat 42 to retain the carrier and the marking means in operative position. To move the carrier to open or inoperative position, the head end 38 is forced inwardly manually until the reduced neck 37 is positioned within the seat 42 at which time the carrier can be pivoted upwardly, the neck moving through the slot 41.

The unit is adapted to be positioned removably in the jacket of a check pad although it should be understood that it is also adapted to be mounted upon other supports. An illustrative check pad jacket is indicated in the drawing at 41 and is seen to include an overlying pocket 42. The plate 11 of base 10 is provided with outwardly extending studs 43 which extend upwardly through the pocket and seat spring type snaps 44 which prevent displacement. The check pad, which is also adapted to be carried by the jacket, is not shown, being of standard type, but is adapted to be positioned with its end adjacent the housing so that with the jacket folded, the protector and the pad will be entirely enclosed.

In the use of the protector constructed in accordance with the present invention, after drawing the check the user will exert an inward force upon the head 28 of detent 27 to displace the extension 36 thereof from its seat 42 in the wall 12. The carrier or housing can then be pivoted outwardly, the reduced neck 37 moving through slot 41 to the position shown in Figure 5 or even higher. The check can then be placed upon the base 10 in such position that the wheels or rotors 31 will make contact therewith upon that area containing the name of the payee, and the amount to be paid, and the signature of the drawer. With the check so positioned, the carrier is then lowered, the operator holding the detent 27 depressed to enable the neck 37 to enter the slot 41. In a preferred variant of the construction the wall 12 may be extended upwardly and outwardly, as indicated in dotted lines at 50 in Figure 5, so that the outer end of extension 36 will be cammed inside of the wall 12 to eliminate the necessity for the operator to hold the detent depressed in the seating movement. With the check positioned and the carrier in its operative relationship, the user then exerts a longitudinal pulling force upon the check to cause it to travel below the marking wheels 31. This movement causes the wheels to make a series of marks or perforations across the paper which renders it substantially impossible subsequently to alter the check in an unobvious manner.

While the particular device herein shown and described in detail is fully capable of attaining the objects and providing the advantages hereinbefore stated, it is to be understood that it is merely illustrative of the presently preferred embodiments of the invention and that no limitations are intended to the details of construction or design herein shown other than as defined in the appended claims.

I claim:

1. A check protector comprising a base, rotatable check marking means, means mounting said marking means for pivotal movement on said base about an axis at right angles to the axis of rotation of said rotary means, a spring pressed detent movable with said marking means and including an extended seating portion, a reduced neck, and a force receiving head, a wall on said base formed with a slot opening into a larger detent seat, said wall extending adjacent the movable end of said marking means, characterized in that the extended seating portion of said detent is adapted to seat within said detent seat with said marking means in operative position and in that the application of a force upon said head displaces said seating portion from said seat and enables said reduced neck to traverse said slot in the pivotal movement of said marking means to inoperative position.

2. A check protector of the type in which a check is moved therethrough in the marking operation and including a rigid base, a carrier pivoted on one side of said base for movement between overlying and spaced angular positions, rotatable marking means carried by said carrier for rotation about an axis at right angles to the carrier pivotal axis, said marking means including axially spaced series of circumferentially arranged projections extended through the plane of the top surface of said base with said carrier pivoted into overlying position, said base being slotted to receive said projections, the slots being sufficiently wide to enable said projections to move therein upon the pivotal movement of said carrier, said base and said carrier including cooperating means to retain said carrier in its operative overlying position comprising a spring pressed detent carried by said carrier in the axis of rotation of said marking means and a seat therefor on said base.

3. A check protector of the type in which a check is moved therethrough in the marking operation and including a rigid base, a carrier pivoted on one side of said base for movement between overlying and spaced angular positions, a rotatable marking unit carried by said carrier including a multiplicity of axially and circumferentially spaced marking projections, a sleeve extended in said carrier serving as the axis of rotation of said projections, pins extended from the ends of said sleeve into seats in said carrier, a coil spring in said sleeve urging said pins axially into their seats in said carrier, characterized in that one of said pins extends beyond said carrier into displaceable seating engagement with said base with said carrier positioned in overlying operative position with respect thereto.

RICHARD I. HELLER.

REFERENCES CITED

The following references are of record in the file of this patent:

UNITED STATES PATENTS

| Number | Name | Date |
|---|---|---|
| 966,938 | Mitchell | Aug. 9, 1910 |
| 1,228,844 | Stephenson | June 5, 1917 |
| 1,520,277 | Callahan | Dec. 23, 1924 |
| 1,842,907 | Lawhorn | Jan. 26, 1932 |
| 1,855,199 | Peaker | Apr. 26, 1932 |
| 1,879,354 | Levi | Sept. 27, 1932 |
| 1,943,404 | Weston | July 16, 1934 |
| 2,186,336 | Heller | Jan. 9, 1940 |